Dec. 5, 1967   G. DE COYE DE CASTELET   3,355,900
AIR-CONDITIONING DEVICES USING THE PELTIER EFFECT FOR
AUTOMOBILE VEHICLES AND THE LIKE AND FOR MACHINES
Filed June 28, 1966
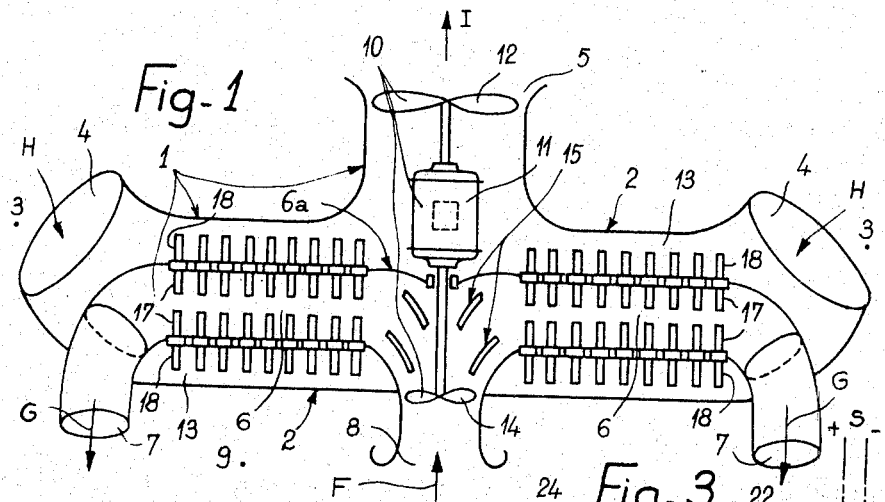
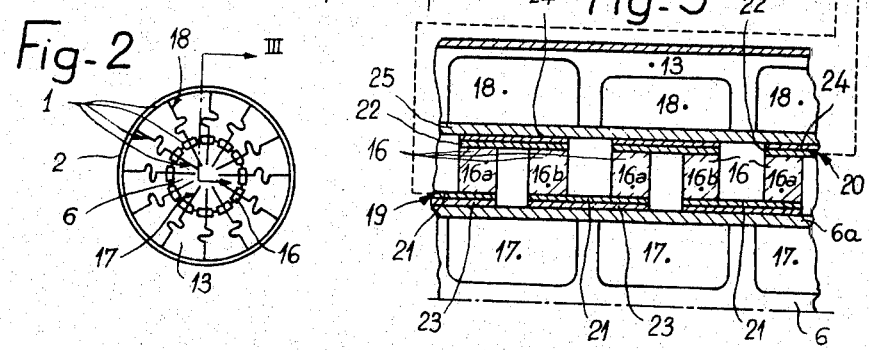
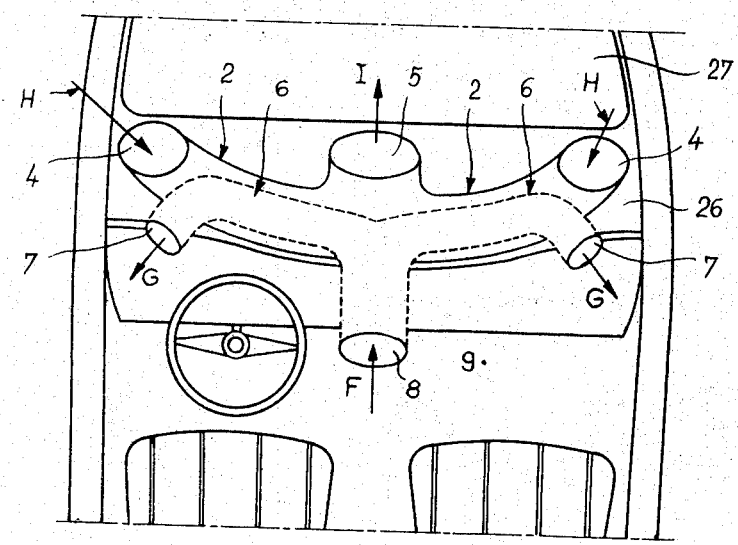

United States Patent Office 3,355,900
Patented Dec. 5, 1967

3,355,900
AIR-CONDITIONING DEVICES USING THE PELTIER EFFECT FOR AUTOMOBILE VEHICLES AND THE LIKE AND FOR MACHINES
Gaëtan de Coye de Castelet, Billancourt, France, assignor to Regie Nationale des Usines Renault, Billancourt, France
Filed June 28, 1966, Ser. No. 561,234
Claims priority, application France, Aug. 3, 1965, 27,058, Patent 1,452,822
11 Claims. (Cl. 62—3)

ABSTRACT OF THE DISCLOSURE

A vehicle air-conditioning device utilizing the Peltier effect. The device includes thermo-electric elements disposed on the surface of a conduit with their internal faces thermally coupled to a radiator within the conduit and their outer faces thermally coupled to an external radiator. A second conduit is concentrically mounted about the first conduit and external radiator, one conduit being open to ambient air and the other conduit being open to the passenger space of the vehicle.

---

The present invention has for its object to provide a device of the type comprising thermo-electric elements utilizing the Peltier effect and specially adapted, by reason of its low weight and its small overall dimensions, for the air-conditioning of automobile vehicles and aircraft or the like and also for machines.

A device of this kind is essentially characterized by the fact that its thermo-electric elements are arranged at the surface of a conduit, the internal face of these elements being thermally coupled to at least one radiator located inside the conduit, and the other face being thermally coupled to at least one external radiator, a second conduit substantially concentric with the first, enclosing the external radiator, these two conduits communicating respectively, one with the outside air, the other with the air contained in an interior occupied space of a vehicle or machine.

In order that the object of the invention may be more clearly understood, there will now be described one form of its embodiment, taken as an example and illustrated in the accompanying drawings.

In these drawings:

FIG. 1 is a diagrammatic view of this form of embodiment;

FIG. 2 shows in cross-section an alternative form of the device of FIG. 1;

FIG. 3 is a detail view of the arrangement of the thermo-electric elements of FIG. 1; and FIG. 4 shows the installation of the device of FIG. 1 in a vehicle.

Referring now to FIG. 1 of the drawings, it is seen that the device 1 comprises an external conduit 2 in communication with a space 3 (generally ambient air) through pipes 4 and 5, and an internal conduit 6 in communication by means of pipes 7 and 8 with the passenger space 9 (FIGS. 1 and 4) of a vehicle or machine, for example. A fan 10, driven by means of a motor 11, preferably electric, ensures by means of an exhaust rotor 12 a circulation of air taken from the space 3 into the duct 13 comprised between the conduits 2 and 6 and, by means of the intake rotor 14, a circulation of air taken from the passenger-space 9 into the conduit 6 and guided by means of fins 15 arranged inside the pipe 8.

The wall 6a of the internal conduit 6 is equipped with an appropriate number of thermal-electric elements 16, utilizing the Peltier effect, provided with fins 17 and 18 and supplied (see FIG. 3) at the points 19 and 20 for example, with electrical direct current obtained from a source "S" (not shown in the drawing), preferably an alternator with rectifier diodes and of the type with excitation or with permanent magnets. The thermo-electric elements 16 may constitute the wall 6a of the conduit 6 (see FIG. 1), or alternatively they may be arranged at its surface (see FIG. 3), the fins 17 then belonging to the conduit 6. In addition, the fins 18 located in the duct 13 may extend up to the internal surface of the conduit 2 and may be thermally connected to this latter if it is a conductor of heat (see FIG. 2).

In the form of embodiment shown in FIG. 3, small plates 16a and 16b respectively of types "n" and "p" of a compound of bismuth telluride and bismuth selenide, or of bismuth telluride for example, and electrically coupled by means of straps 21 and 22, electrically conductive and preferably of copper, constitute the thermo-electric elements 16 inserted, with the additional interposition of electrically-insulating sheets 23 and 24, between the wall 6a of the conduit 6, and a heat-conductive plate 25, this wall and this plate being respectively provided with fins 17 and 18.

There will now be described the operation of the above device when it is working as a cooler (FIGS. 1 and 4).

The lukewarm air from the space 9, drawn-in by means of the intake rotor 14 of the fan 10 trough the pipe 8, is cooled as it passes through the conduit 6, sweeping over the fins 17 in thermal contact with the cold internal faces of the thermo-electric elements 16, utilizing the Peltier effect, and returns cooled to the passenger space 9 through the pipes 7.

The ambient air coming from the exterior 3, drawn-in by means of the exhaust rotor 12 of the fan 10 through the pipes 4, serves to provide the cooling for the fins 18 in contact with the hot outer faces of the elements 16, and it is returned to the exterior by means of the pipe 5.

As can be seen from FIG. 1, the two air-circulation systems referred to above take place in the directions indicated by the arrows F and G on the one hand, and H and I on the other, in opposite directions, thus rendering uniform the differences of temperature existing between the hot and cold or outer and inner faces of the thermo-electric element 16.

In addition, it will be noted that since the conduits 2 and 6 are concentric, it is easy to arrange for the outer fins 18 an exchange surface very much greater than that of the internal fins 17, and thus to evacuate under good conditions the amount of heat created by the hot faces of the element 16, which is very much greater than the quantity of heat absorbed by their cold faces.

An air-conditioning device according to the invention may also serve as a heating apparatus for the passenger space 9. For this purpose, it is only necessary to reverse the direction of the direct-current supply, by connecting for example the terminal 19 (see FIG. 3) to the negative pole of the source "S," and the terminal 20 to the positive pole of this source, or alternatively to close the pipes 7 by means of shutters (not shown) and to send air coming from the exterior 3 and heated during its passage through the duct 13, into the passenger space 9.

Finally, it is easy to see, by referring to FIG. 4 of the drawing, the small overall size of the form of construction described above, which in practice is housed in a compartment 26, intermediate between the passenger space 9 and the front luggage boot or engine compartment 27 of an automobile vehicle, for example.

It will of course be understood that the form of construction described above is not limitative and may be given any desirable modifications, without thereby departing from the scope of the invention.

By way of illustration of this remark, it should be noted that the conduits 2 and 6 may be folded back so as to take the shape of an S or of a hairpin, or any other shape capable of reducing their dimension in length. In addition, it is possible to arrange the pipes 4 outside the vehicle, so that a circulation of air may be established in the duct 13 and in consequence to dispense with the exhaust rotor 12 of the fan 10, or to reinforce its action.

What is claimed:

1. An air-conditioning device for passenger spaces of vehicles and the like utilizing the Peltier effect, comprising a first conduit, thermo-electric elements utilizing the Peltier effect disposed in the surface of said conduit, at least one internal radiator means mounted inside said first conduit, at least one external radiator means mounted externally of said first conduit the internal faces of the elements being thermally coupled to said internal radiator means, and the other faces of said elements being thermally coupled to said external radiator means, a second conduit substantially concentric with the first conduit and enclosing the external radiator means, one of the conduits communicating by its orifices with the air external to the passenger space while the other conduit communicates by its orifices with the passenger space.

2. A device in accordance with claim 1, in which insulating means separate said thermo-electric elements utilizing the Peltier effect, said elements and said separators forming said first conduit.

3. A device in accordance with claim 1, in which one of said conduits is provided with orifices which open to the exterior of the vehicle so that a circulation of air may be set-up through the radiator which is enclosed by said conduit.

4. A device in accordance with claim 1, and further comprising a fan provided so as to establish a circulation of air in the conduit which communicates with the passenger space.

5. A device in accordance with claim 1, and further provided with a fan mounted in each of the conduits and ensuring a circulation of air, the two fans being driven by a common electric motor.

6. A device in accordance with claim 1, in which the circulation of air in each of the conduits is effected in opposite directions, one with respect to the other.

7. A device in accordance with claim 3, in which the circulation of air in each of the conduits is effected in opposite directions, one with respect to the other.

8. A device in accordance with claim 4, in which the circulation of air in each of the conduits is effected in opposite directions, one with respect to the other.

9. A device in accordance with claim 5, in which the circulation of air in each of the conduits is effected in opposite directions, one with respect to the other.

10. An air-conditioning apparatus for automobile vehicles, comprising two pairs of conduits in accordance with claim 1, arranged in line with each other, the two external conduits and the two internal conduits opening respectively into two central orifices located on the same axis, while two fans mounted one in the central orifice of the external conduits and the other in the central orifice of the internal conduits, are mounted on a common shaft driven by a common electric motor.

11. A device in accordance with claim 5 in which one of said fans is an intake fan and the other fan is an exhaust fan.

References Cited

UNITED STATES PATENTS

| | | | |
|---|---|---|---|
| 3,077,080 | 2/1963 | Pietsch | 62—3 |
| 3,085,405 | 4/1963 | Frantti | 62—3 |
| 3,138,934 | 6/1964 | Roane | 62—3 |

WILLIAM J. WYE, *Primary Examiner.*